US009861036B2

United States Patent
Totten et al.

(10) Patent No.: US 9,861,036 B2
(45) Date of Patent: Jan. 9, 2018

(54) SKID SHOE FOR A HEADER OF AN AGRICULTURAL HARVESTER

(71) Applicant: CNH Industrial America LLC, New Holland, PA (US)

(72) Inventors: Nathaniel Kip Totten, Lititz, PA (US); Melanie W. Harkcom, New Holland, PA (US); Kyle Kenning Runkle, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/331,494

(22) Filed: Jul. 15, 2014

(65) Prior Publication Data

US 2016/0014963 A1    Jan. 21, 2016

(51) Int. Cl.
- *A01D 67/00* (2006.01)
- *A01D 43/10* (2006.01)
- *A01D 34/74* (2006.01)

(52) U.S. Cl.
CPC ........... *A01D 43/107* (2013.01); *A01D 34/74* (2013.01)

(58) Field of Classification Search
CPC .... A01D 41/14; A01D 61/002; A01D 41/141; A01D 43/06; A01D 34/14; A01D 67/00; A01D 34/664; A01D 34/8355
USPC .............. 56/181, 15.8, 296, DIG. 24, 17.4; D15/18, 28
See application file for complete search history.

(56) References Cited

U.S. PATENT DOCUMENTS

| | | | | |
|---|---|---|---|---|
| 2,102,710 A | * | 12/1937 | Hume | A01D 57/20 56/158 |
| 2,228,538 A | * | 1/1941 | Smith | A01D 34/00 280/14 |
| 2,700,265 A | * | 1/1955 | Spieth | A01D 57/20 56/16.3 |
| 2,918,774 A | * | 12/1959 | McCarty | A01D 82/00 56/1 |

(Continued)

FOREIGN PATENT DOCUMENTS

WO    2013101875    7/2013

OTHER PUBLICATIONS

Model 973 Combine Header/Model 974 Flex Draper Combine Header—Operator's Manual, Jan. 2007.

(Continued)

*Primary Examiner* — Arpad Fabian-Kovacs
(74) *Attorney, Agent, or Firm* — Peter K. Zacharias; Patrick M. Sheldrake

(57) ABSTRACT

A header for an agricultural harvester including a skid shoe that is resistant to penetration into soil. The skid shoe includes a central portion having a fore end, an aft end, and first and second lateral sides extending between the fore and aft ends. At least a first upwardly directed surface extends from the first lateral side and defines a first soil deflecting surface configured to resist penetration of the skid shoe into soil. The header includes a chassis that experiences upwardly and radially directed applied loads during operation, including during turning of the header. The skid shoe is operable to receive such loads while effectively deflecting soil as the header traverses a field being harvested. As a result of the upwardly directed surface of the skid shoe, less damage is inflicted on the field and the crop growing therein.

20 Claims, 12 Drawing Sheets

(56) References Cited

U.S. PATENT DOCUMENTS

| | | | |
|---|---|---|---|
| 2,963,845 A | 12/1960 | Matile | |
| 2,986,863 A * | 6/1961 | McCarty | A01D 89/00 56/1 |
| 3,043,081 A | 7/1962 | Sandall | |
| 3,599,406 A * | 8/1971 | Akgulian | A01D 34/24 56/17.2 |
| 3,611,681 A * | 10/1971 | Blanton et al. | A01D 41/14 56/10.4 |
| 3,747,311 A * | 7/1973 | DeCoene | A01D 41/141 56/208 |
| 3,925,971 A * | 12/1975 | Goering | A01D 89/004 56/15.8 |
| 3,982,384 A * | 9/1976 | Rohweder | A01D 45/021 56/106 |
| 4,156,338 A * | 5/1979 | Hengen | A01D 45/021 56/106 |
| 4,204,383 A * | 5/1980 | Milliken, Jr. | A01D 57/00 56/10.2 E |
| 4,441,307 A | 4/1984 | Enzmann | |
| 4,573,308 A | 3/1986 | Ehrecke et al. | |
| 4,599,852 A * | 7/1986 | Kerber | A01D 41/14 56/15.8 |
| 4,633,656 A * | 1/1987 | Willinger | A01D 34/664 56/13.6 |
| 4,660,360 A * | 4/1987 | Hardesty | A01D 41/14 56/15.8 |
| 4,665,685 A * | 5/1987 | Rupprecht | A01D 41/14 56/15.8 |
| 4,729,212 A * | 3/1988 | Rabitsch | A01D 41/14 56/119 |
| 4,835,954 A | 6/1989 | Enzmann | |
| D302,432 S * | 7/1989 | Rabitsch | D15/28 |
| D314,778 S * | 2/1991 | Rabitsch | D15/28 |
| 5,174,101 A | 12/1992 | Rabitsch | |
| 5,713,190 A | 2/1998 | Vermeulen et al. | |
| D391,582 S * | 3/1998 | Bruns | D15/28 |
| 5,924,270 A | 7/1999 | Bruns | |
| D423,522 S * | 4/2000 | Huntimer | D15/28 |
| D454,576 S * | 3/2002 | Huntimer | D15/28 |
| 7,198,428 B2 * | 4/2007 | Pizzuto | A01B 31/00 172/180 |
| 7,222,474 B2 * | 5/2007 | Rayfield | A01D 41/141 56/10.2 E |
| 7,373,769 B2 * | 5/2008 | Talbot | A01D 34/14 56/296 |
| 7,472,533 B2 * | 1/2009 | Talbot | A01D 57/20 56/181 |
| 7,478,521 B2 * | 1/2009 | Coers | A01D 41/14 56/208 |
| 7,478,522 B1 * | 1/2009 | Lovett | A01D 41/14 56/296 |
| 7,549,280 B2 * | 6/2009 | Lovett | A01D 61/002 56/208 |
| 7,591,127 B1 | 9/2009 | Stacer et al. | |
| 7,600,364 B2 * | 10/2009 | Lovett | A01D 61/002 56/181 |
| 7,640,720 B1 * | 1/2010 | Lovett | A01D 57/20 56/153 |
| 8,056,310 B2 | 11/2011 | Whitenight et al. | |
| 8,191,345 B2 | 6/2012 | Honas et al. | |
| 8,322,520 B2 * | 12/2012 | Dow | A01D 61/002 198/837 |
| 8,341,928 B2 | 1/2013 | Sauerwein et al. | |
| 8,430,732 B1 | 4/2013 | Totten et al. | |
| 9,095,093 B2 * | 8/2015 | Hyronimus | A01D 75/00 |
| 2006/0162311 A1 * | 7/2006 | Talbot | A01D 34/14 56/296 |
| 2007/0204584 A1 * | 9/2007 | Coers | A01D 61/002 56/15.8 |
| 2009/0266044 A1 | 10/2009 | Coers et al. | |
| 2010/0043375 A1 * | 2/2010 | Schmidt | A01D 41/14 56/181 |
| 2010/0095646 A1 * | 4/2010 | Schmidt | A01D 41/14 56/14.3 |
| 2011/0154794 A1 * | 6/2011 | Coers | A01D 67/00 56/181 |
| 2013/0019581 A1 * | 1/2013 | Hyronimus | A01D 63/00 56/314 |
| 2013/0020100 A1 * | 1/2013 | Shoup | A01B 61/046 172/762 |
| 2013/0020101 A1 * | 1/2013 | Shoup | A01B 39/22 172/763 |
| 2013/0061569 A1 * | 3/2013 | McClenathen | A01D 34/8355 56/52 |
| 2013/0160417 A1 * | 6/2013 | Huseman | A01D 41/14 56/181 |
| 2013/0177348 A1 * | 7/2013 | Hyronimus | A01D 75/00 403/164 |

OTHER PUBLICATIONS

R1150GS Skid Plate Set, Inner & Outer, http://www.beemerboneyard.com/11111341636.html, Oct. 11, 2013.

Poly Skid Shoe Sets, http://www.maywes.com/skid_shoes_complete_sets, Oct. 11, 2013.

OMFH318468, http://www.manuals.deere.com/omview/OMFH318468_19/TB90758,00000DF_19_20120703 . . . , Oct. 11, 2013.

* cited by examiner

SKID SHOE FOR A HEADER OF AN AGRICULTURAL HARVESTER

BACKGROUND

The subject application relates generally to a header for use with agricultural harvesters. In particular, the subject application relates to an improved skid shoe for use with pull-type or self-propelled mower headers.

Mower headers have been used to cut plants including, but not limited to, hay, grasses, small grains and the like for many years. Such mower headers are often referred to as Disc Mower Conditioners (DMCs). A pull-type DMC is pulled by a tractor and can have a trailing tongue that pivots and is attached to the left side of the header trail frame or chassis (Side Pull DMC) or it can have a trailing tongue that pivots and attaches to the center of the header trail frame or chassis (Center Pivot DMC). Side pull DMC's can only pivot to the right of the tractor and center pivot DMC's can pivot to the left or right of the tractor. The cutting of the DMC, whether pull-type or self-propelled, is typically performed by a disc cutter bar. The cutterbar is made up of multiple discs arranged in side-by-side relationship with each disc having a plurality of cutting knives. The discs spin at a certain RPM sufficient to cut the crop. The knives and discs then feed the cut crop into a conditioner. At present, there are two types of conditioners: roll conditioners and flail conditioners. The rolls can be either rubber, urethane or steel. Which conditioner is used depends on the crop being cut. After being conditioned the crop is propelled out the back of the DMC and onto the ground. Adjustable shielding in the back of the DMC allows the operator to lay the cut crop in a swath such that it covers the ground like a carpet or mat or in a windrow whereby crop lays in a tall row. The manner in which crop is laid on the ground (mat or windrow) depends on whether the crop needs to be dried more and/or how it is to be picked up and packaged.

Whether pull-type or self-propelled, DMCs are normally equipped with stationary skid shoes under the cutting elements or a long pan that slides along the ground under the cutting elements. The skid shoes or pan serve as a wear surface to protect the expensive cutting elements from excessive wear. DMCs may also have the option to be equipped with vertically adjustable skid shoes provided along the cutterbar for setting the height of the cutting discs with respect to the ground surface. The vertical adjustability of the skid shoes is useful for several reasons. For example, the crop being cut may need to have a relatively higher or lower stubble height after being cut. In this instance, the adjustable skid shoes allow the cutterbar to be raised or lowered accordingly. They can also be appropriately adjusted if a farmer is harvesting a field populated with a lot of obstructions such as rocks. In this case, the cutterbar can be raised so that the knives do not strike and become damaged by the obstructions or rocks.

Skid shoes are rigid members, usually formed of rugged, wear resistant material including but not limited to metal or hardened plastic. During operation, the skid shoes slide over the ground and the weight of the header is borne in large measure by the skid shoes. A conventional skid shoe includes a fore end, an aft end and lateral sides extending between the fore and aft ends. The fore and aft ends are normally upwardly extending. The lateral sides are constructed with flat lateral edges which lend themselves to destructive soil contact as the header is turned, as further described below.

A considerable disadvantage of conventional adjustable skid shoes is that they tend to forcefully penetrate into the soil as the header is turned to the left or to the right. More particularly, as the header pivots or veers from a straight heading, it pushes the radially innermost lateral edges of the skid shoes sideways and downwardly in the direction of the turn thereby applying more force on the radially innermost lateral edges of the skid shoes. The result is that the flat lateral edges of the skid shoes tend to dig or plow into the soil. This forceful lateral soil penetration leaves divots, streaks and ruts and accelerates wear/damage of the skid shoes, and damage to the crop in the field.

BRIEF SUMMARY

In accordance with a first aspect, the subject application provides a skid shoe for a header of an agricultural harvester. The skid shoe includes a central portion having a fore end, an aft end and first and second lateral sides extending between the fore and aft ends. The skid shoe further includes a first upwardly directed surface extending from the first lateral side defining a first soil deflecting surface configured to resist penetration of the skid shoe into soil.

In accordance with a second aspect, the subject application provides a header for an agricultural harvester including a chassis having an upwardly directed applied load and a skid shoe connected to the chassis. The skid shoe includes a central portion having a fore end, an aft end and first and second lateral sides extending between the fore and aft ends deflecting the upwardly directed applied load. In addition, the skid shoe includes a first upwardly directed surface extending from the first lateral side and defining a first soil deflecting surface configured to resist penetration of the skid shoe into soil.

In accordance with a third aspect, the subject application provides a header for an agricultural harvester including a chassis receiving an upwardly directed applied load and a skid shoe connected to the chassis. The skid shoe includes a central portion having a fore end, an aft end and first and second lateral sides extending between the fore and aft ends deflecting the upwardly directed applied load. In addition, the skid shoe includes a first upwardly directed surface extending from the first lateral side and defining a first soil deflecting surface configured to resist penetration of the skid shoe into soil.

In accordance with a fourth aspect, the subject application provides a method for resisting penetration of a skid shoe of a header for an agricultural harvester into soil. The method includes the acts of providing a skid shoe having a central portion and a first upwardly directed lateral surface defining a first soil deflecting surface, and deflecting soil about the first soil deflecting surface as the header is operated so as to contact the skid shoe against the soil.

In accordance with a fifth aspect, the subject application provides a skid shoe for a header of an agricultural harvester. The skid shoe includes a central portion having a fore end, an aft end and first and second lateral sides extending between the fore and aft ends. At least one of the lateral sides is provided with an upwardly directed surface defining a soil deflecting surface configured to resist penetration of the skid shoe into soil in response to force applied to the skid shoe in a lateral or radial direction. The upwardly directed surface can be formed by a flange that may be integrally incorporated into the skid shoe or as a separate part which is attached to the skid shoe. Such flange(s) can be arranged at any angle with respect to the central portion. They can be of any width and length and can be oriented in any direction or placed anywhere on the skid shoe. The skid shoe may be bowl or dish-shaped and it may be fabricated by any suitable process including, but not limited to, stamping, forming or welding.

BRIEF DESCRIPTION OF THE SEVERAL VIEWS OF THE DRAWINGS

The foregoing summary, as well as the following detailed description of several aspects of the subject application, will be better understood when read in conjunction with the appended drawings. For the purpose of illustrating the subject application there are shown in the drawings several aspects, but it should be understood that the subject application is not limited to the precise arrangements and instrumentalities shown.

In the drawings.

DETAILED DESCRIPTION

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

Figure 1:
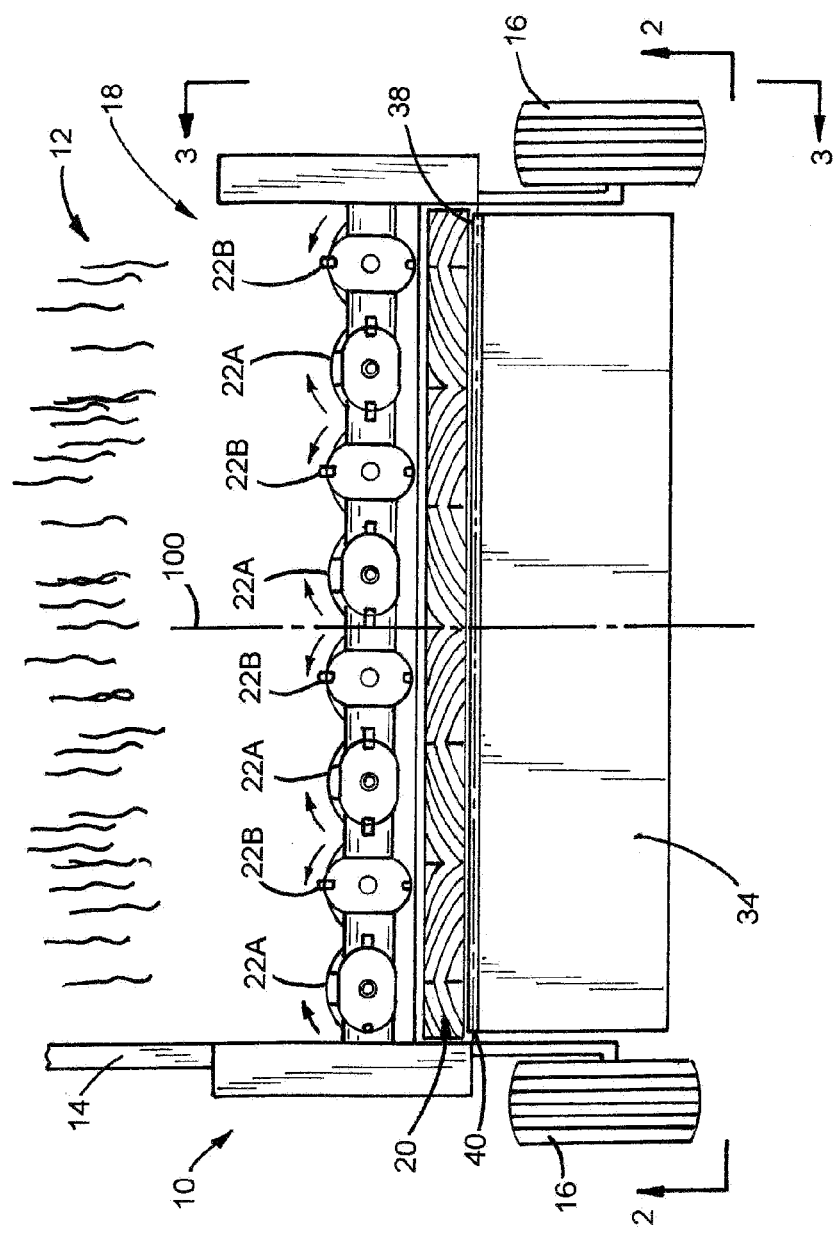
FIG. 1 is a partial bottom plan view of a typical pull-behind agricultural mower or header.
Figure 2:
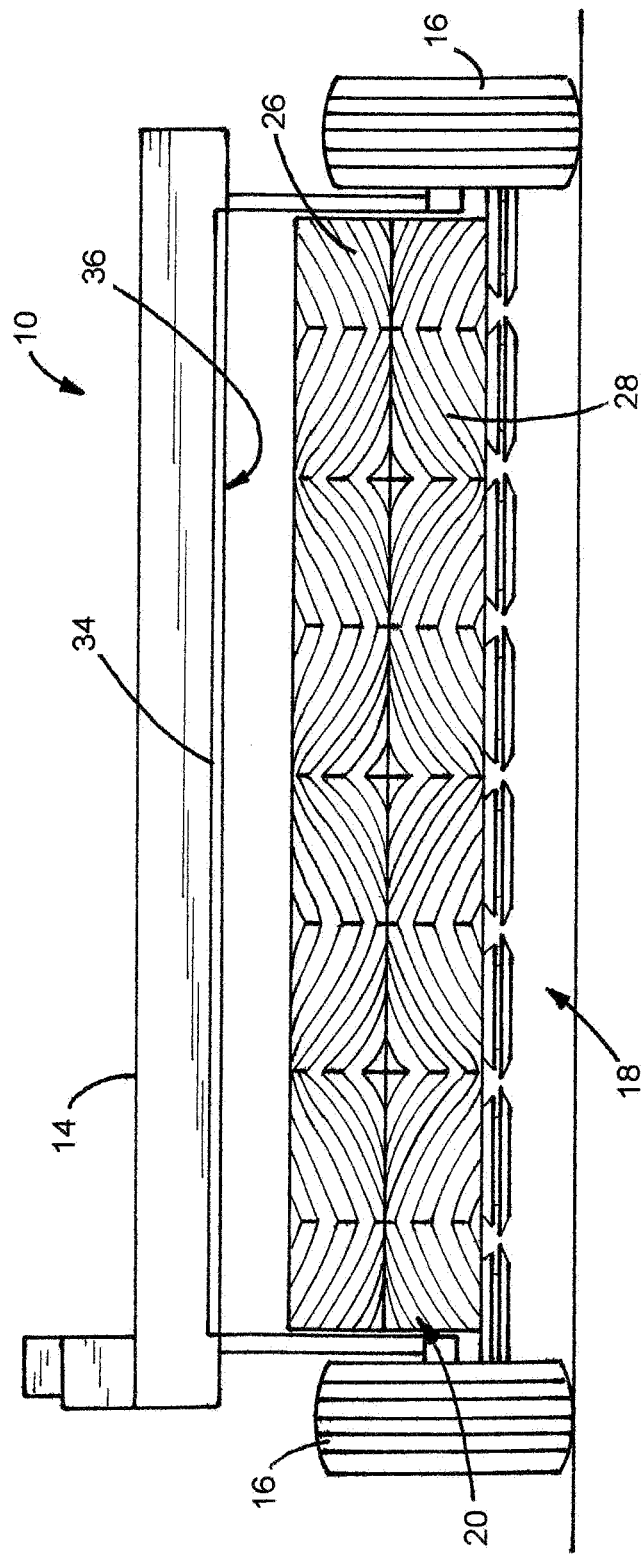
FIG. 2 is a rear elevation view of the header of FIG. 1.
Figure 3:
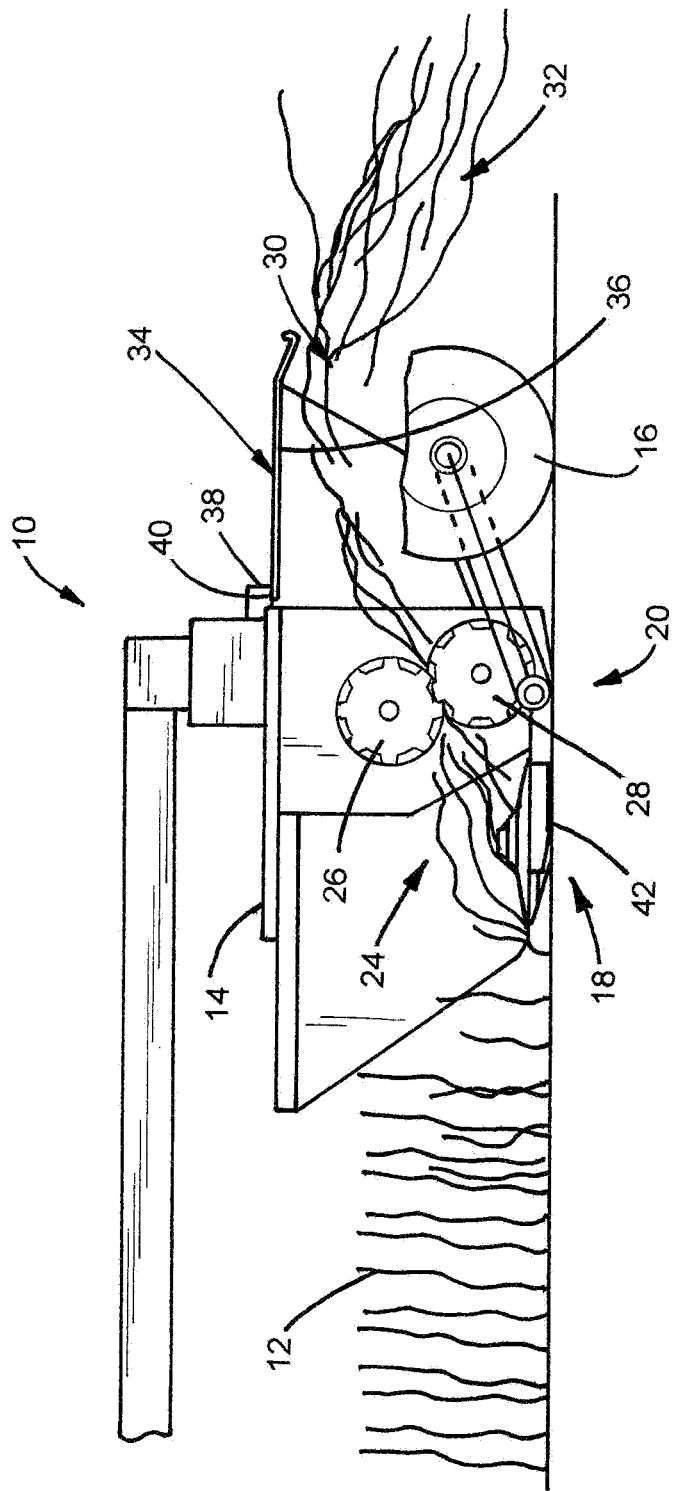
FIG. 3 is a partial side elevation view of the header of FIG. 1.

Referring now to the drawings, wherein aspects of the subject application are shown, FIGS. 1-3 illustrate several features of a conventional pull-type DMC with which the skid shoes of the subject application may find beneficial application. More specifically, FIGS. 1-3 show a conventional pull-behind agricultural mower-conditioner or DMC 10 used for cutting and conditioning a standing crop 12 as it travels forwardly across the ground along a main axis of movement 100. The mower-conditioner 10 is supported by a frame 14 which is operably connected to a tractor (not shown) and supported by a pair of trailing wheels 16. The frame 14 is configured to raise and lower the mower-conditioner relative to the ground surface to support mowing and transport operations. The crop 12 is severed from the ground by a transversely disposed cutting apparatus 18 whereupon it is directed toward and engaged by a conditioning mechanism 20. As seen in FIG. 1 the cutting apparatus 18 comprises a plurality of rotary disc cutter modules 22A, 22B arranged so that adjacent pairs of modules counter-rotate. Certain adjacent pairs (22A/22B) rotate so that the cutters converge cut crop material 24 therebetween while other adjacent pairs (22B/22A) divergingly rotate so that cut crop is directed away from the space between the cutters 22.

The conditioning mechanism 20 may comprise a pair of transversely elongate conditioning rolls 26, 28 as shown in FIGS. 2 and 3, or it may comprise a flail-type conditioner in which crop passes between a single roll with radially arranged flails and a closely proximate adjacent surface in order to crush the crop material 24. Conditioning rolls 26, 28 are closely spaced apart on parallel, transverse axes such that a gap is created therebetween through which crop material passes. The crop material is then ejected rearwardly from the conditioning rolls 26, 28 in a plurality of airborne streams 30 (FIG. 3) along a trajectory generally parallel to main axis 100 (FIG. 1) whereupon it falls to the ground in a mat 32 (FIG. 3). A swathgate or swathboard 34 is typically provided to allow alteration of the crop trajectory and thereby control the configuration of the resultant mat of crop material on the ground behind the mower.

Swathboard 34 comprises a generally planar crop guide surface 36 (FIGS. 2 and 3) disposed slightly above the trajectory of crop material ejected from conditioning rolls 26, 28. Swathboard 34 may be movably connected to the mower 10 so that guide surface 36 may be angularly positioned to interact to varying degrees with the streams of crop material and thereby influence the trajectory of the crop material streams discharged from the conditioner apparatus. For example, swathboard 34 may be pivotally coupled near its leading edge 38 (FIG. 1) to the mower along an axis 40 transversely aligned on the mower. The transverse pivot axis 40 allows the swathboard 34 to be angularly adjusted to deflect the flow of crop material being discharged from the conditioning rolls 26, 28 for optimal placement behind the mower-conditioner. Most swathboards are manually angularly adjusted to the desired crop trajectory based upon the crop being harvested and the spatial relationship between the conditioner rolls and the ground for the nominal header operating height on level ground. Once set, the swathboard or swathgate is typically not moved while the machine is operating. Mowers using fixed-position swathboards are also known.

As seen in FIG. 3, the frame or chassis 14 of DMC 10 can rest upon a pair of skid shoes 42 (only one of which is shown). The skid shoes enable the DMC frame 14 to float over the ground as the apparatus traverses a field being harvested. Skid shoes 42 can be vertically adjustable to set the height of the cutters 22 with respect to the ground surface. The skid shoes 42 define fore and aft ends and lateral sides extending between the fore and aft ends. The fore and aft ends may be formed with upwardly directed soil deflecting surfaces while the lateral sides are flat. As described above, these flat lateral sides or edges of conventional skid shoes dig into the soil as the DMC is turned to the left or right and cause damage to the field and/or the crop growing therein.

Other structural and operational features of pull-behind DMCs are disclosed in U.S. Pat. Nos. 8,430,732 and 8,056,310, the entire disclosures of which are incorporated by reference herein in their entirety. It will be understood that the subsequently-described skid shoes according to the subject application are suitable not only for pull-type and self-propelled DMCs but also any agricultural harvester header wherein turning of the header is common during a harvesting operation.

Figure 4:
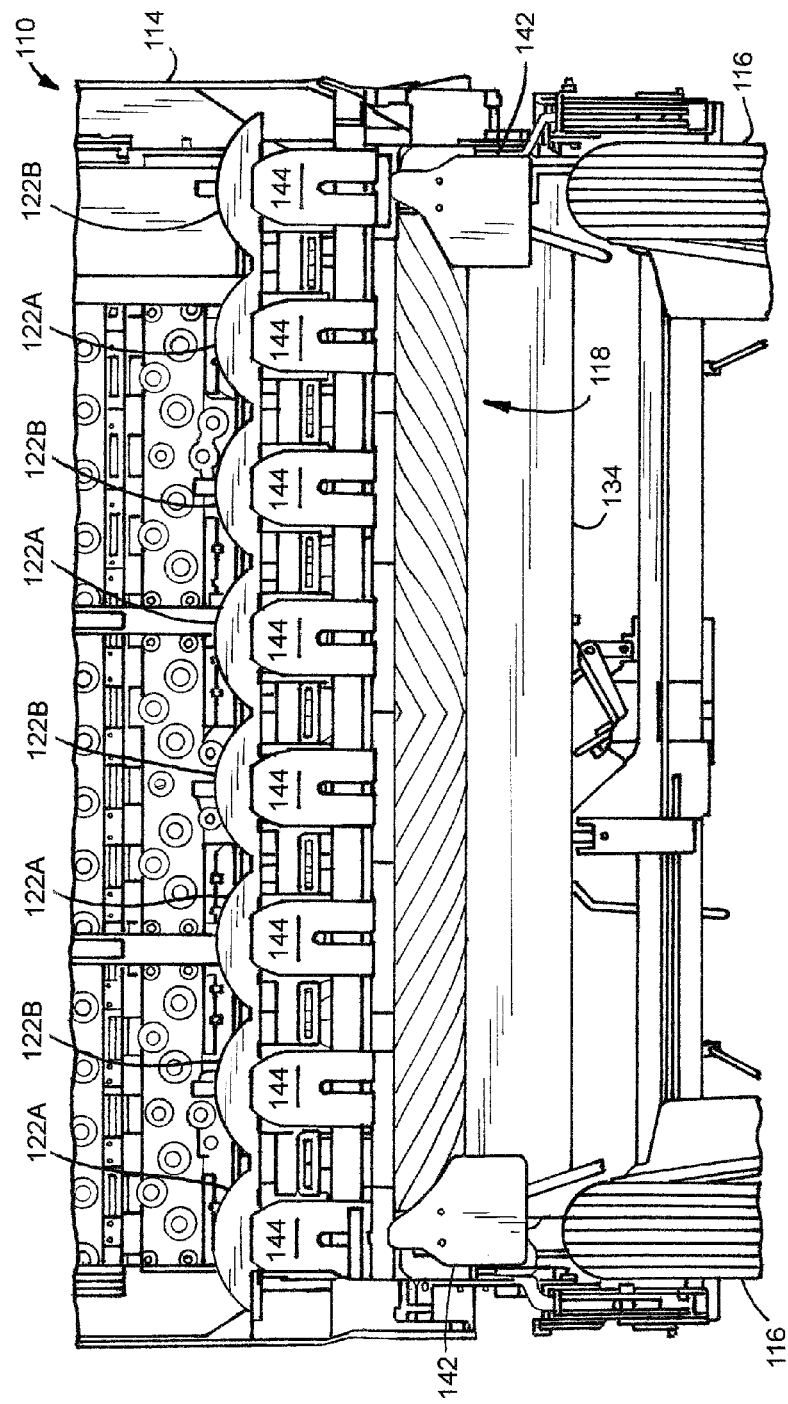
FIG. 4 is a bottom view of a header equipped with skid shoes in accordance with an aspect of the subject application.
Figure 5:
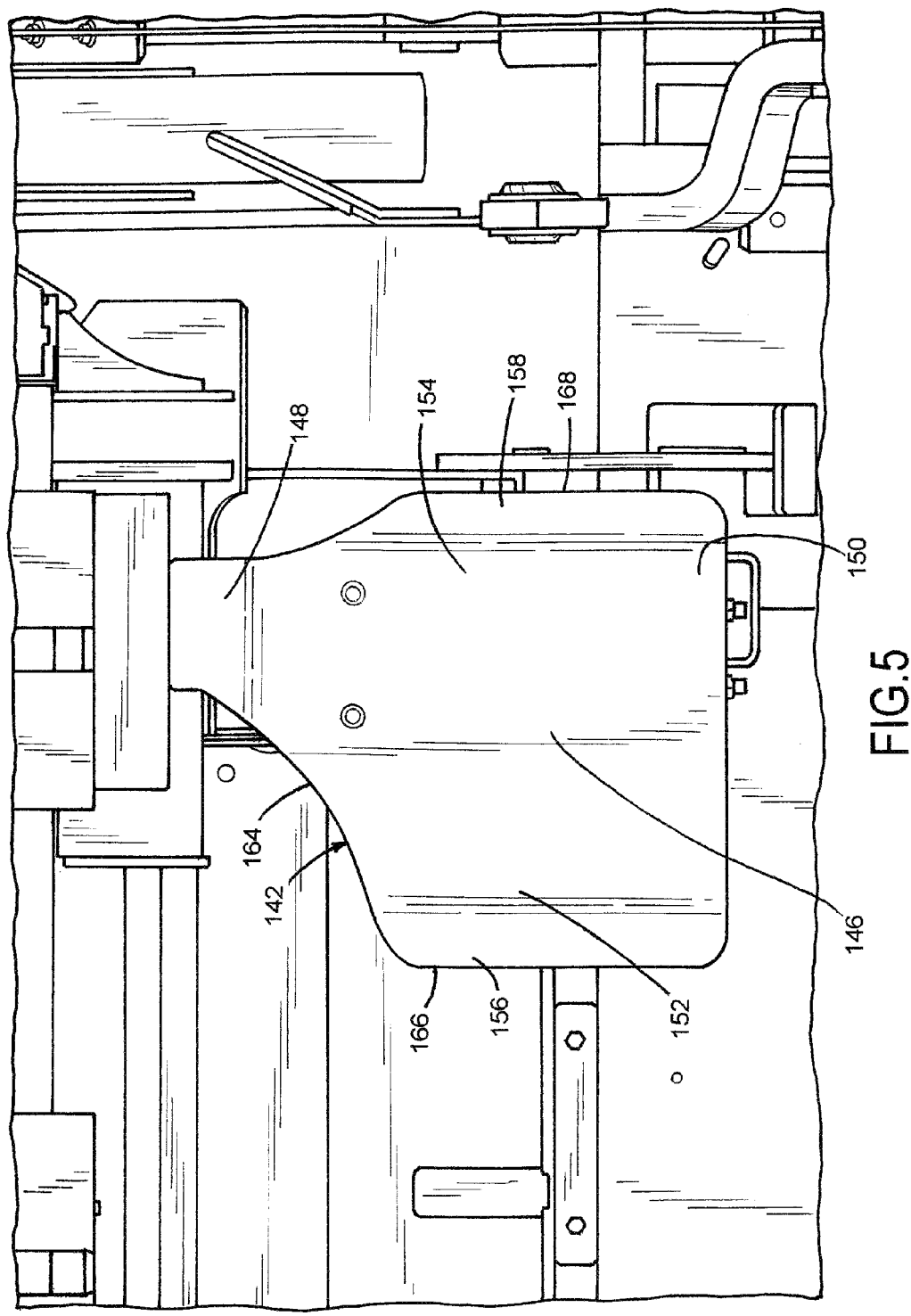
FIG. 5 is an enlarged bottom view of the skid shoe of FIG. 4.
Figure 6:
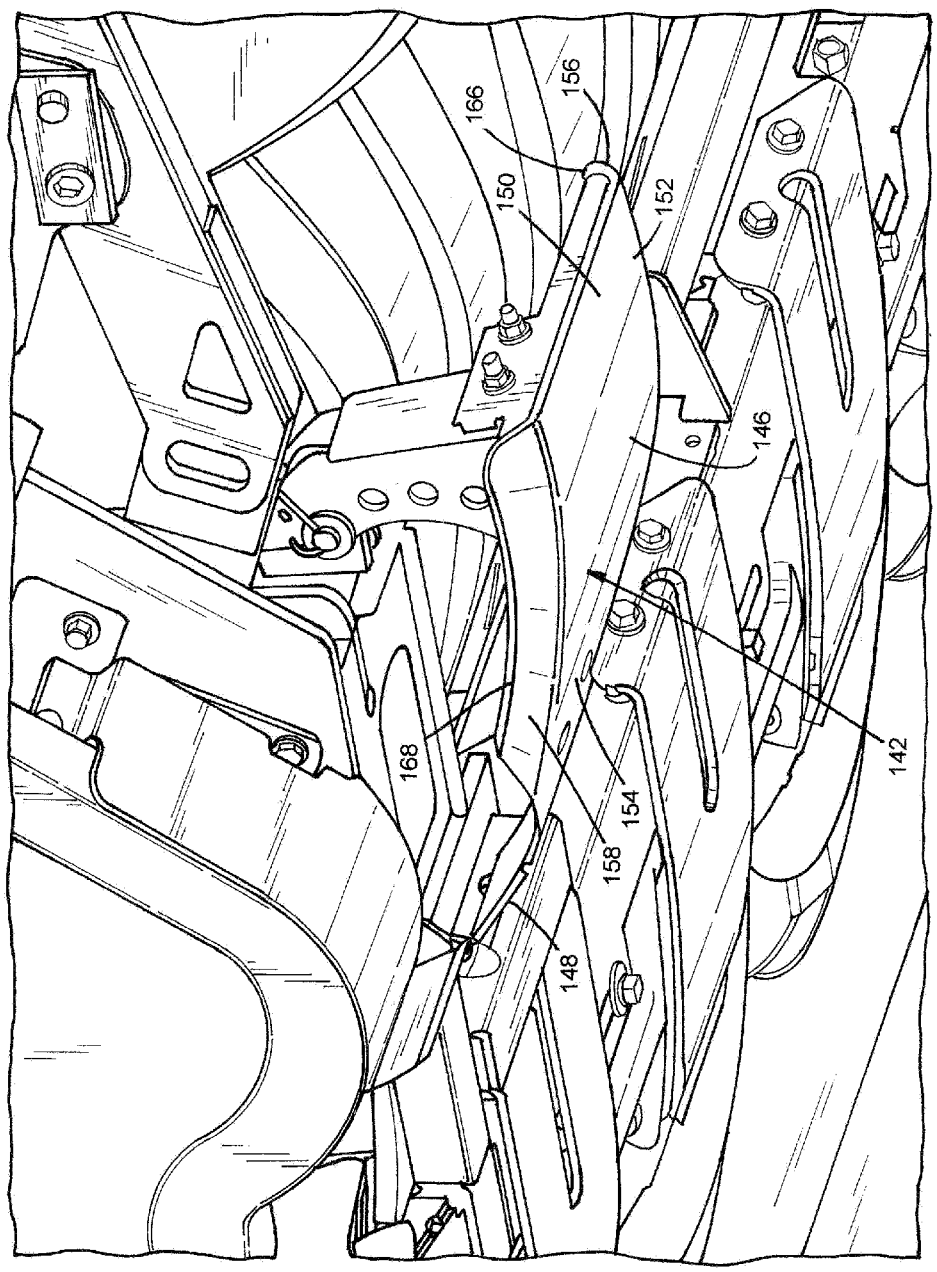
FIG. 6 is a bottom perspective view of the skid shoe of FIG. 5.

Referring to FIG. 4, there is shown a header 110 according to the subject application which experiences turning during a harvesting operation. The header 110, which may be of the pull-type, self-propelled or otherwise, includes a pair of skid shoes 142 situated at first and second ends of a header frame or chassis 114. The skid shoes 142 are disposed forwardly of trailing wheels 116 in the direction of travel of the header. A plurality of stationary skid shoes 144 is provided between and in advance of skid shoes 142 in the direction of header travel. The stationary skid shoes 144 are typically not vertically adjustable and skid shoes 142 serve to assist skid shoes 144 in protecting cutter modules 122A, 122B from harm as the chassis 114 traverses the ground surface. Skid shoes 144 are used to traverse the ground when skid shoes 142 are not in use. As a consequence of travelling over the ground, the header chassis has or receives an upwardly directed applied load against the skid shoes. Moreover, as will be described in greater detail below, the header chassis and the skid shoes carried thereby experiences laterally or radially directed applied loads as the header is turned from a straight path.

Turning to FIGS. 5-9, the structural features of skid shoe 142 are shown in greater detail. The skid shoe 142 includes a central portion 146 having a fore end 148, an aft end 150, and first and second lateral sides 152, 154 extending between the fore and aft ends. According to the aspect of the skid shoe 142 depicted in FIGS. 5-8, each of the first and second lateral sides 152, 154 is provided with first and second upwardly directed surfaces 156, 158 extending from the first lateral side and the second lateral side, respectively, which define first and second soil deflecting surfaces configured to resist penetration of the skid shoe into soil. Each of the first and second upwardly directed surfaces can be formed by an upwardly directed flange. In other words the skid shoe can be configured with a substantially hull shaped cross-section. However, as will be discussed in greater detail in connection with FIG. 13, it is also contemplated that only one of the first and second lateral sides 152, 154 may be provided with an upwardly directed surface, which surface is disposed along the outermost edge of one of the first and second lateral sides.

Figure 7:
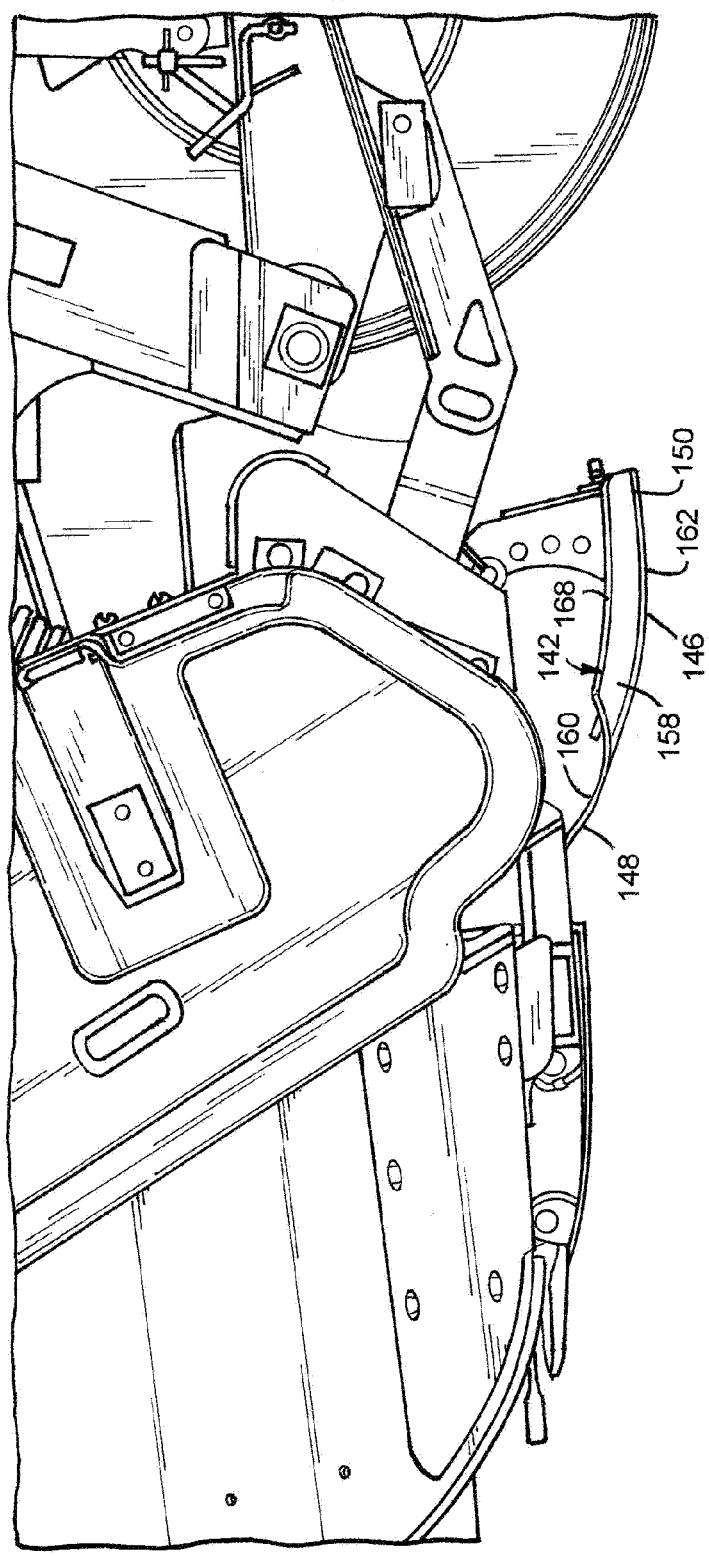
FIG. 7 is a partial side elevation view of the header of FIG. 4.
Figure 8:
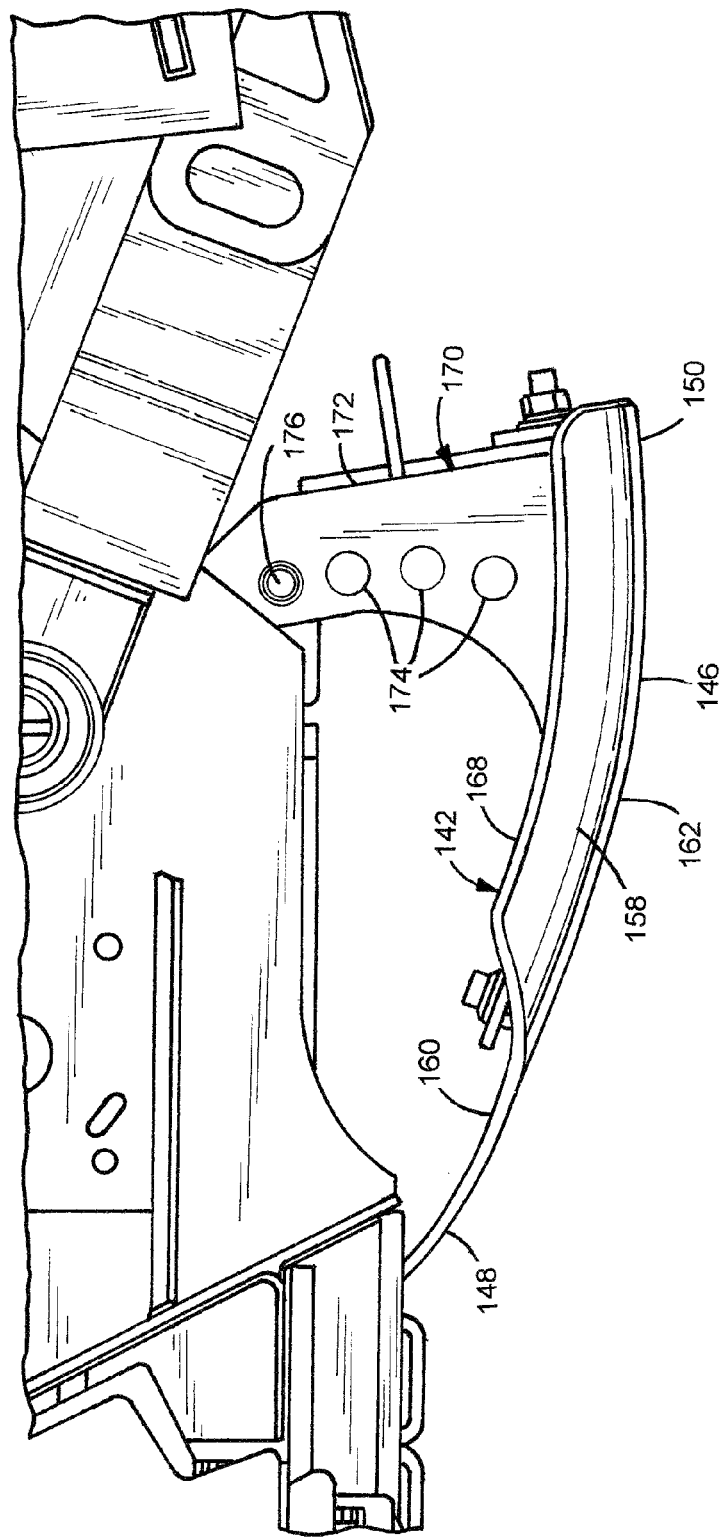
FIG. 8 is a side elevation view of the skid shoe of FIG. 5.
Figure 9:
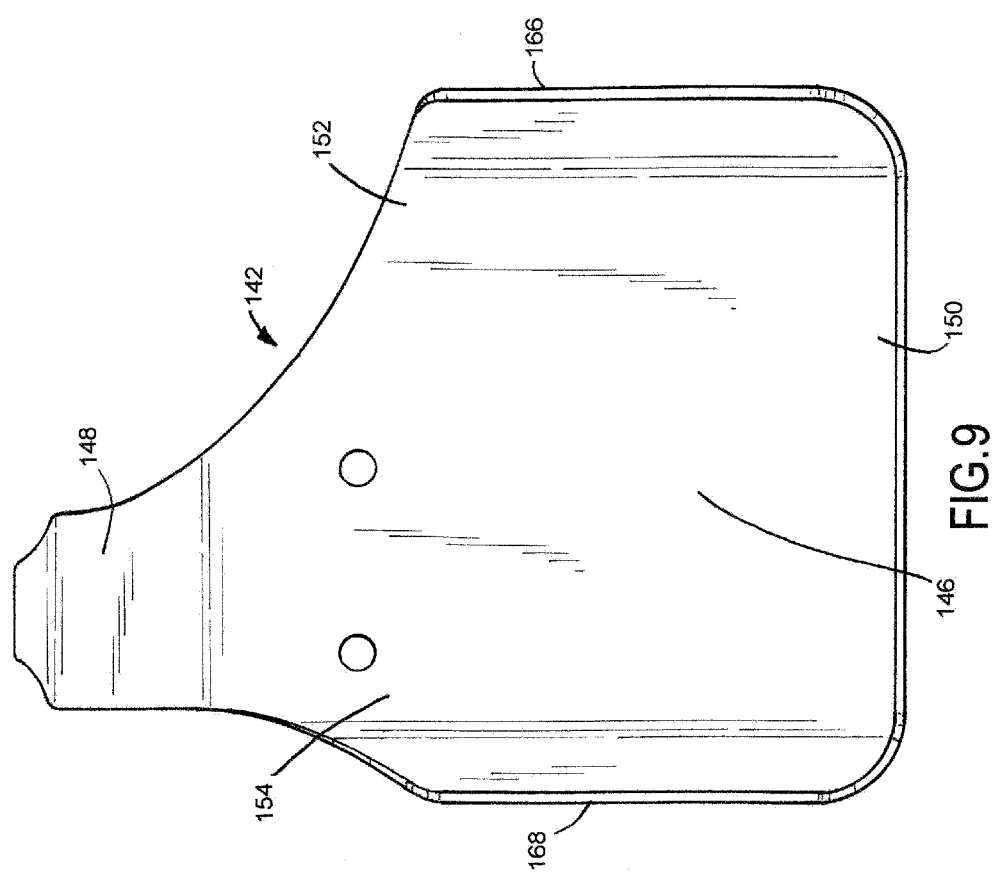
FIG. 9 is a top plan view of the skid shoe of FIG. 5.

As seen most clearly in FIGS. 7 and 8, the central portion 146 has a concave inner surface 160 and a convex outer surface 162 in facing engagement with a ground surface. It is also contemplated that the central portion 146 has a curved lateral cross-sectional profile.

As most clearly seen in FIG. 10 below, but equally applicable to the aspect of the skid shoe shown in FIGS. 4-9, the first and second upwardly directed surfaces can be disposed at an acute angle α with respect to the central portion 146 as measured from the first or second soil deflecting surfaces. Further, the first and second upwardly directed surfaces 156, 158 can be formed by upwardly directed flanges 166, 168. The flanges may be formed integrally with or separately attached to the central portion 146. In this regard, such flanges can be arranged at any angle with respect to the central portion, but preferably at least 10 degrees with respect to the central portion. They can be of any width and length and can be oriented in any direction or placed anywhere on the skid shoe. In addition, the skid shoe may be bowl or dish-shaped and it may be fabricated by any suitable process including, but not limited to, stamping, forming or welding.

Referring to FIG. 8, there is shown in detail an exemplary manner by which the skid shoe 142 can be vertically adjusted with respect to the header frame 114. For example, the skid shoe 142 may include an adjustment mechanism 170 configured to adjust an elevation of the central portion 146 with respect to the header. According to an aspect, the adjustment mechanism includes at least one support arm 172 extending upwardly from the central portion, the support arm(s) including a plurality of spaced apart apertures 174 for receiving a fastener 176 such as a bolt, pin, or the like for attaching to the header. The positioning of the plurality of spaced apart apertures allows for adjustment of the height of the central portion.

Figure 10:
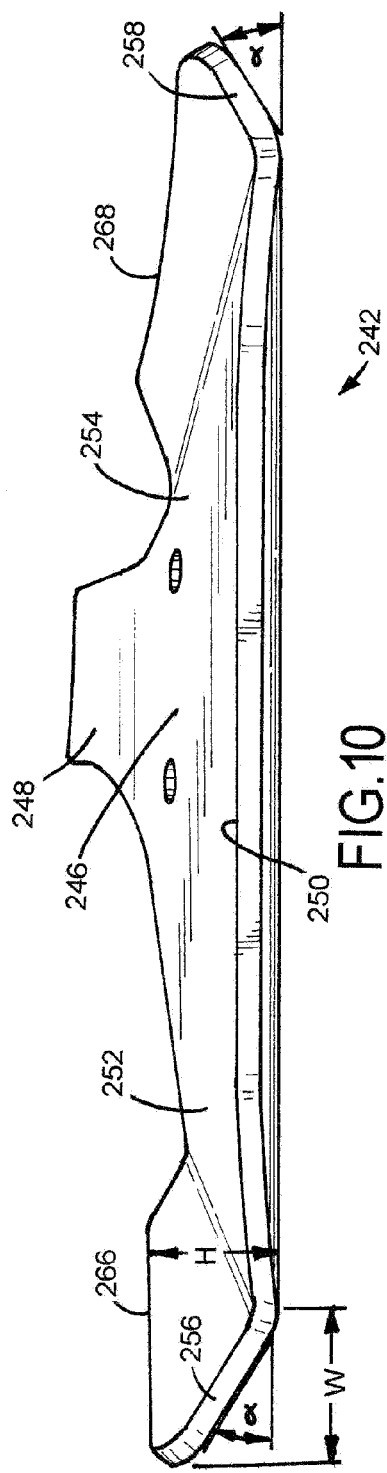
FIG. 10 is a rear elevation view of a skid shoe in accordance with another aspect of the subject application.
Figure 11:
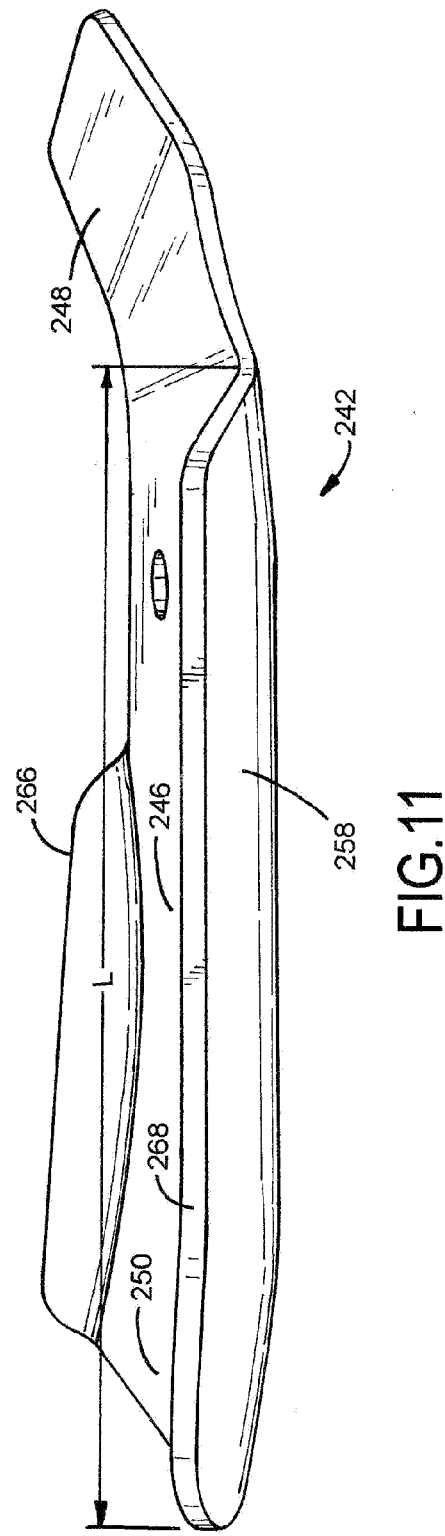
FIG. 11 is a side elevation view of the skid shoe of FIG. 10.
Figure 12:
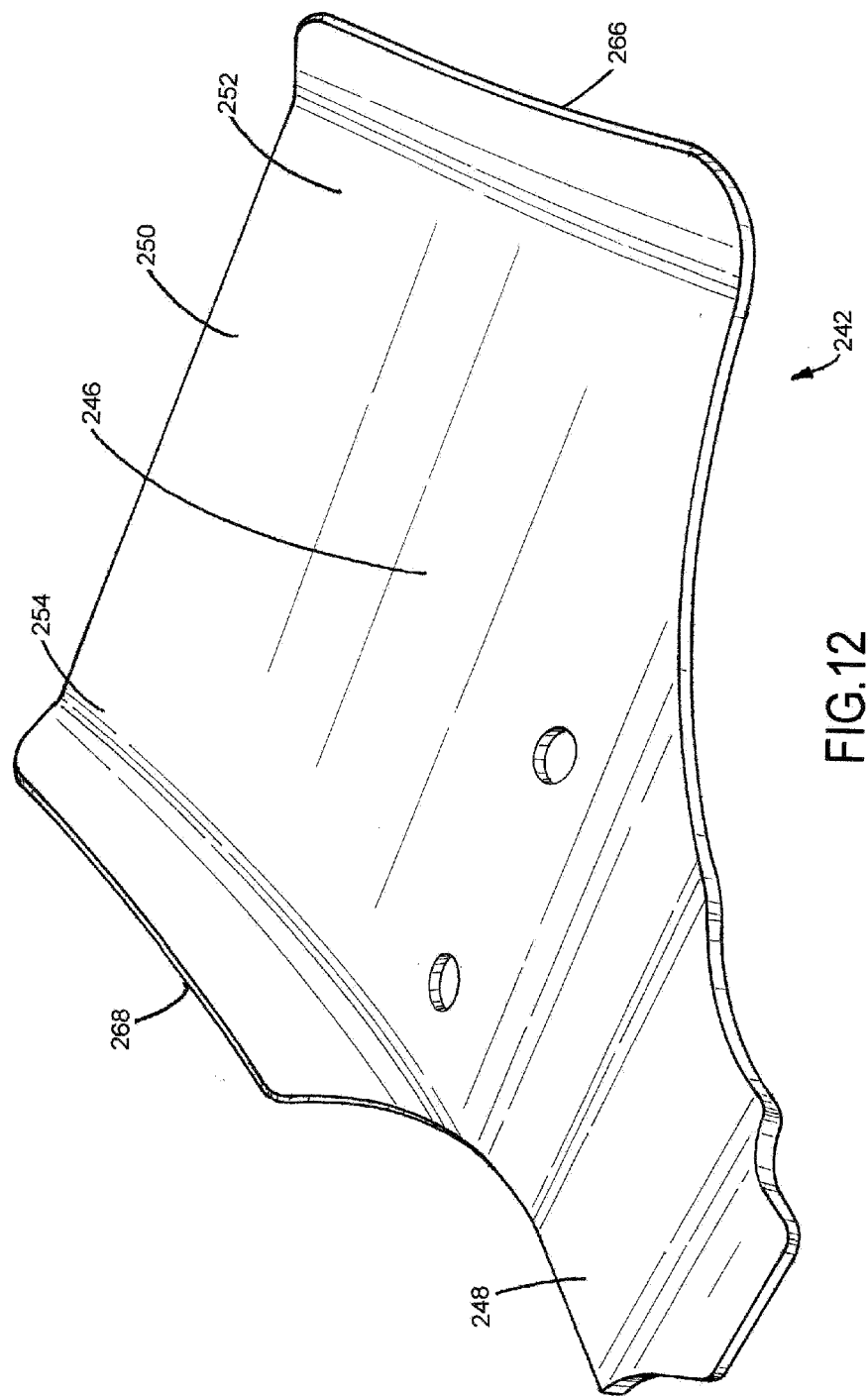
FIG. 12 is a top perspective view of the skid shoe of FIG. 10.

Referring to FIGS. 10-12, there is shown a skid shoe 242 in accordance with a further aspect of the subject application. Skid shoe 242 includes a central portion 246, a fore end 248, an aft end 250, and first and second lateral sides 252, 254 extending between the fore and aft ends. According to the aspect of the skid shoe 242 depicted in FIGS. 10-12, each of the first and second lateral sides 252, 254 is provided with an upwardly directed surface 256, 258, respectively, which define first and second soil deflecting surfaces configured to resist penetration of the skid shoe into soil. The first and second upwardly directed surfaces 256, 258 can be formed by upwardly directed flanges 266, 268.

Referring to FIG. 10 in particular, it is seen that the first and second upwardly directed surfaces 256, 258 can be disposed at an angle α with respect to the central portion 246 as measured from the first and second soil deflecting surfaces. Angle α (regardless of whether in reference to skid shoe 242, previously described skid shoe 142 or subsequently described skid shoe 342) is an acute angle ranging from between about 1 to 90 degrees with respect to the central portion of the skid shoe and may vary according to harvesting and soil conditions the header might be expected to encounter.

As also seen in FIG. 10, flanges 266, 268 (and thus upwardly directed surfaces 256, 258) are defined by a height H and a width W. FIG. 11 shows that flanges 266, 268 and their corresponding upwardly directed surfaces are further defined by a length L. Similar to angle α, the flange height H, width W and length L of all of the skid shoes described herein may be varied to suit contemplated harvesting and soil conditions. In addition, the spatial dimensions of the flanges, as well as the overall dimensions, shapes and contours of the skid shoes described herein, may also be selected to accommodate headers of various sizes. For example, the height of the flange can range from 1 mm to about 200 mm, the width from about 1 mm to 200 mm, a length from about 1 mm to 1000 mm, and an angle α from about 1 degree to about 90 degrees.

Figure 13:
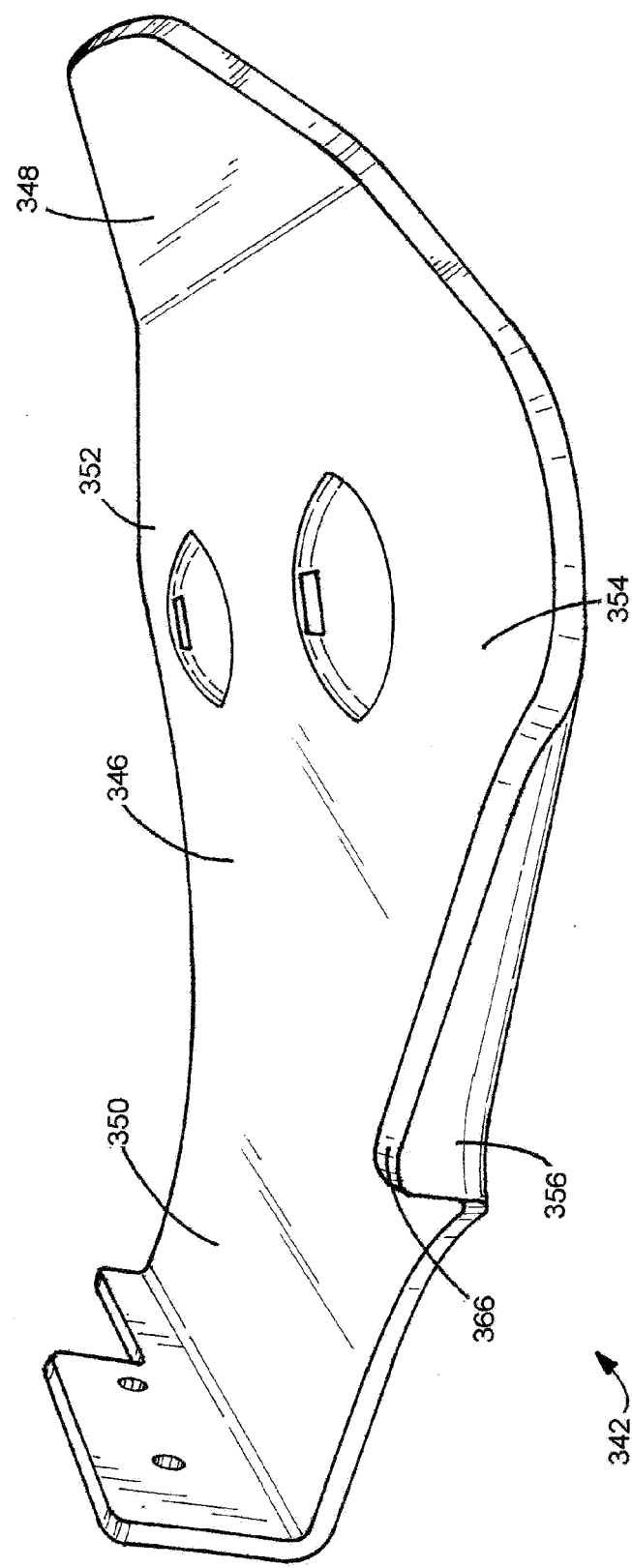
FIG. 13 is a top perspective view of a skid shoe in accordance with a further aspect of the subject application.

Turning to FIG. 13 there is shown a skid shoe 342 constructed in accordance with a further aspect of the subject application. Skid shoe 342 includes a central portion 346, a fore end 348, an aft end 350, and first and second lateral sides 352, 354 extending between the fore and aft ends. Unlike skid shoes 142 and 242, however, skid shoe 342 possesses a single upwardly directed surface 356 adjacent lateral side 352 which defines a first soil deflecting surface configured to resist penetration of the skid shoe into soil. The single upwardly directed surface 356 may be formed by an upwardly directed flange 366 of desired length, width, height and angle with respect to the central portion 346 as may be appropriate for the harvesting conditions, soil conditions and the size of the header to which the skid shoe 342 is attached. As illustrated in FIG. 13, flange 366 is located on the right side of the skid shoe 342 as considered from the rear of the header and facing in the direction of travel of the header. Thus, skid shoe 342 would be mounted to the right side of the header such that the flange 366 and corresponding upwardly directed surface 356 would define an upwardly directed soil deflecting surface facing laterally outwardly to the right of the header. It will be understood that an unillustrated skid shoe of mirror image to that of skid shoe 342, e.g., with an upwardly directed surface and flange extending along the left side of the skid shoe would be provided on the left side of the header. In this way, when the header is turned to the right or to the left the outwardly directed soil deflecting surfaces of the skid shoes 342 would resist penetration of the skid shoes into soil on the direction of the turn.

FIG. 13 reveals a further structural feature of a skid shoe constructed in accordance with the subject application. As seen in FIG. 13, rather than extending parallel to a vertical anterior-to-posterior plane extending from the front to the rear of the skid shoe, upwardly directed surface 356 of flange 366 can be arranged to face laterally and rearwardly. In this way, surface 356 serves to deflect soil laterally and rearwardly away from the central portion 346 relative to an anterior posterior direction of the header. As a result, there is a reduced likelihood of lateral penetration of the skid shoe into soil e.g., when the header is engaged in a turn.

The subject application thus contemplates skid shoes of various configurations having at least a first upwardly directed surface extending from a first lateral side of the skid shoe and defining at least a first soil deflecting surface. The skid shoes and their upwardly directed surfaces may assume desired shapes, sizes and other dimensional attributes suitable to resist penetration of the skid shoes into soil when headers carrying the skid shoes are turned to the left or right.

The subject application further contemplates a header for an agricultural harvester which includes such skid shoes. More specifically, the subject application includes a header, e.g., header 110 of FIG. 4, whether of the pull-type, self-propelled or otherwise which undergoes turning during a harvesting operation. The header includes a frame or chassis such as chassis 114 (FIG. 4) having or receiving an upwardly directed applied load from the soil over which the header travels. The header further includes a skid shoe connected to the chassis. The skid shoe includes a central portion having a fore end, an aft end and first and second lateral sides extending between the fore and aft ends. The skid shoe deflects the upwardly directed applied load. The skid shoe further includes at least a first upwardly directed surface extending from the first lateral side and defining a first soil deflecting surface configured to resist penetration of the skid shoe into soil. According to certain aspects, the skid shoe further comprises a second upwardly directed surface extending from the second lateral side and defining a second soil deflecting surface configured to resist penetration of the skid shoe into soil. Moreover, as the header is turned from a straight path the chassis includes or receives a radially directed applied load and the skid shoe deflects the radially directed applied load while resisting penetration into soil.

The subject application further includes a method for resisting penetration of a skid shoe of a header for an agricultural harvester into soil. The method includes the acts of providing a skid shoe having a central portion and a first upwardly directed lateral surface defining a first soil deflecting surface, and deflecting soil about the first soil deflecting surface as the header is operated so as to contact the skid shoe against the soil. According to an aspect, the skid shoe providing act further includes providing a second upwardly directed lateral surface extending about an opposite side of the central portion and defining a second soil deflecting surface. The method further contemplates the act of deflecting soil about both the central portion and at least one of the first and second upwardly directed lateral surfaces as the header is operated and contacts soil.

The subject application thus provides a skid shoe of improved design which, by virtue of at least one lateral upwardly directed soil deflecting surface, serves to resist penetration of the skid shoe into soil as the header veers from a straight path of travel. The consequences of such a construction include fewer divots, streaks and ruts being carved into the field and less damage to crop growing in the field as well as the header itself. As a result of less crop damage, harvest yield is correspondingly increased.

It will be appreciated by those skilled in the art that changes could be made to the various aspects described above without departing from the broad inventive concept thereof. It is to be understood, therefore, that the subject application is not limited to the particular aspects disclosed, but it is intended to cover modifications within the spirit and scope of the subject application as defined by the appended claims.

We claim:

1. A skid shoe for a header of an agricultural harvester comprising:
   a fore end;
   an aft end;
   a central region spanning in a fore and aft direction a continuously curved side cross-sectional profile, having:
      first and second lateral sides extending between the fore and aft ends,
   wherein the fore end extends asymmetrically from the central region relative to a centerline of the central region; and
   a first upwardly directed surface extending from the first lateral side having a forward terminus spaced from a terminus of the fore end and defining a first soil deflecting surface configured to resist penetration of the skid shoe into soil, wherein the first upwardly directed surface is disposed at an acute angle with respect to a plane defined by and tangentially intersecting the central region as measured from the first soil deflecting surface.

2. The skid shoe of claim 1, wherein the central region has a concave inner surface and a convex outer surface in facing engagement with a ground surface.

3. The skid shoe of claim 1, further comprising a second upwardly directed surface extending from the second lateral side and defining a second soil deflecting surface configured to resist penetration of the skid shoe into soil.

4. The skid shoe of claim 3, wherein the second upwardly directed surface is disposed at an acute angle with respect to a plane tangential to the central region as measured from the second soil deflecting surface.

5. The skid shoe of claim 1, wherein the first upwardly directed surface is formed by an upwardly directed flange extending from a lateral most end of the central region.

6. The skid shoe of claim 1, further comprising an adjustment mechanism configured to adjust an elevation of the central region with respect to the header.

7. The skid shoe of claim 6, wherein the adjustment mechanism comprises at least one support arm extending upwardly from the central region, the support arm including a plurality of spaced apart apertures for attaching to the header.

8. The skid shoe of claim 1, wherein the central region has a substantially constant lateral width between the fore end and the aft end.

9. The skid shoe of claim 1, wherein the fore end ends at an upwardly directed terminus.

10. An agricultural harvester having a header that includes a skid shoe, comprising:
 a chassis having an upwardly directed applied load; and
 the skid shoe connected to the chassis for deflecting the applied load when the harvester moves in a forward direction, the skid shoe including:
  a central portion having a fore end including an upwardly directed terminus aligned with a fore end of the harvester, an aft end aligned with an aft end of the harvester and first and second lateral sides extending between the fore and aft ends configured for deflecting the upwardly directed applied load when the central portion rests evenly on ground, wherein the fore end extends asymmetrically from the central portion relative to a centerline of the central portion, and
  a first upwardly directed surface extending from the first lateral side having a terminus spaced from a terminus of the fore end and defining a first soil deflecting surface configured to resist penetration of the skid shoe into soil.

11. The header of claim 10, wherein the fore end is laterally offset from the centerline of the central portion.

12. The agricultural harvester of claim 10, wherein the fore end is positioned above the aft end during use.

13. The agricultural harvester of claim 10, further comprising an adjustment mechanism configured to adjust an elevation of the central portion with respect to the header about a plurality of discrete positions.

14. A header for an agricultural harvester comprising:
 a chassis receiving an upwardly directed applied load; and
 a skid shoe connected to the chassis, the skid shoe including:
  a central portion, a fore end extending asymmetrically from the central portion relative to a centerline of the central portion, an aft end and first and second lateral sides extending between the fore and aft ends deflecting the upwardly directed applied load, and
  a first upwardly directed surface extending from the first lateral side and defining a first soil deflecting surface deflecting the upwardly directed applied load when the central portion rests evenly on ground and configured to resist penetration of the skid shoe into soil, wherein the first upwardly directed surface has a forward terminus located behind the fore end, and
  an adjustment mechanism including a support arm directly connected to the central portion, the support arm to the header to affix an elevation of the central portion with respect to the chassis about a plurality of discrete positions.

15. The header of claim 14, wherein the skid shoe further comprises a second upwardly directed surface extending from the second lateral side and defining a second soil deflecting surface configured to resist penetration of the skid shoe into soil.

16. The header of claim 14, wherein the chassis further receives a radially directed applied load and the skid shoe deflects the radially directed applied load.

17. The header of claim 14, wherein:
 the central portion has a substantially constant width,
 the fore end is offset toward one of the first and second lateral sides, the fore end including:
  a width less than the width of the central portion, and
  an upwardly directed terminus.

18. The header of claim 14, wherein the adjustment mechanism is positioned adjacent to the aft end.

19. A skid shoe for a header of an agricultural harvester comprising:
 a central portion with a continuously curved side cross-sectional profile in a fore and aft direction having:
  a fore end extending asymmetrically from the central portion relative to a centerline of the central portion,
  an aft end, and
  first and second lateral sides extending between the fore and aft ends;
 a first upwardly directed surface extending from the first lateral side and defining a first soil deflecting surface configured to resist penetration of the skid shoe into soil;
 a second upwardly directed surface extending from the second lateral side and defining a second soil deflecting surface configured to resist penetration of the skid shoe into soil,
 wherein the first and second upwardly directed surfaces are disposed at acute angles with respect to a plane defined by and tangentially intersecting the central portion as measured from the first soil deflecting surface,
 wherein the first and second upwardly directed surfaces are formed by an upwardly directed flange extending from a lateral most end of the central portion, and
 wherein the first and second upwardly directed surfaces each have a forward terminus located behind a terminus of the fore end; and
 an adjustment mechanism comprising at least one support arm extending upwardly from the central portion, the support arm including a plurality of spaced apart apertures for attaching to the header.

20. The skid shoe of claim 19, wherein the support arm is positioned adjacent to the aft end.

* * * * *